United States Patent
Loftus et al.

(10) Patent No.: US 6,889,965 B2
(45) Date of Patent: May 10, 2005

(54) OPPOSING CONICAL PRELOADED ELASTOMERIC BEARING ASSEMBLY

(75) Inventors: Robert T. Loftus, Gilbert, AZ (US); Neal M. Muylaert, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 114 days.

(21) Appl. No.: 09/974,991

(22) Filed: Oct. 10, 2001

(65) Prior Publication Data

US 2003/0068104 A1 Apr. 10, 2003

(51) Int. Cl.[7] .............................................. F16M 1/00
(52) U.S. Cl. ................................... 267/136; 416/134 A
(58) Field of Search ........................... 416/134 A, 191, 416/244 R, 244 B, 106, 107, 160, 135; 384/221; 267/136

(56) References Cited

U.S. PATENT DOCUMENTS

| | | | |
|---|---|---|---|
| 2,482,488 A | * | 9/1949 | Julien .......................... 267/33 |
| 3,782,854 A | | 1/1974 | Rybicki |
| 3,862,812 A | | 1/1975 | Gorndt et al. |
| 4,028,002 A | | 6/1977 | Finney et al. |
| 4,129,403 A | * | 12/1978 | Watson .................... 416/134 A |
| 4,297,078 A | * | 10/1981 | Martin .................... 416/134 A |
| 4,306,836 A | * | 12/1981 | Mayerjak ................ 416/134 A |
| 4,341,499 A | | 7/1982 | Peterson |
| 4,365,936 A | | 12/1982 | Hatch |
| 4,859,148 A | | 8/1989 | Hibyan |
| 5,601,408 A | | 2/1997 | Hunter et al. |
| 6,413,048 B1 | * | 7/2002 | Muylaert ................ 416/134 A |

* cited by examiner

*Primary Examiner*—Robert A. Siconolfi
*Assistant Examiner*—Melanie Torres
(74) *Attorney, Agent, or Firm*—Black Lowe & Graham PLLC (57) ABSTRACT

The invention provides a weight-reducing bearing assembly for rotary aircraft. An opposed tapered conical elastomeric flap bearing assembly for rotary aircraft includes an outer housing having an outer surface and an inner surface. The outer surface is configured to mechanically connect the bearing assembly to the attachment sections of the hub center body. The inner surface is configured to receive a pair of opposed taper conical bearing elements. An inboard bearing element and an outboard bearing element are located within the outer housing. The bearing elements are arranged in an opposed manner. An axial pre-load can be applied to the opposed bearing assembly wherein the resulting force couple bearing pre-load path is maintained entirely within the bearing assembly. Consequently, the weight of the main rotor hub is reduced increasing the efficiency of rotary flight.

20 Claims, 6 Drawing Sheets

OPPOSING CONICAL PRELOADED ELASTOMERIC BEARING ASSEMBLY

RELATED APPLICATION

This application incorporates by reference application titled "Installation of Internally preloaded Opposing Conical Elastomeric Bearing" invented by Neal Muylaert; attorney docket BOEI-1-1006.

FIELD OF THE INVENTION

This invention relates generally to elastomeric bearings and specifically to opposed internally pre-loaded conical elastomeric bearings.

BACKGROUND OF THE INVENTION

A key component of a helicopter is the main rotor hub. It provides attachment of the main rotor blades during operation. Rotational power is delivered to the main rotor hub to provide rotational velocity to the blades in order to create aerodynamic lift. The main rotor hub must allow for rotational motion of the blades in the vertical (flap), horizontal (lead-lag), and axial (pitch) directions near the blade root attachment with the hub to accommodate flight control authority and dynamic stability. Main rotor hub systems that accommodate these motions with discrete hinge mechanisms are referred to as fully articulated hubs. Through out the history of the helicopter, engineers have struggled to provide these rotational freedoms with bearing systems that can accommodate high frequency and high amplitude oscillatory motion under high trust loading created by the centrifugal force of the rotating blades. Elastomeric bearings have become an industry standard for accommodating flapwise motion in articulated hub systems. These bearings are composed of elastomeric material that allows for shear compliance within the elastomer, and for rotational freedom while reacting radial centrifugal force in compression.

Figure 1:
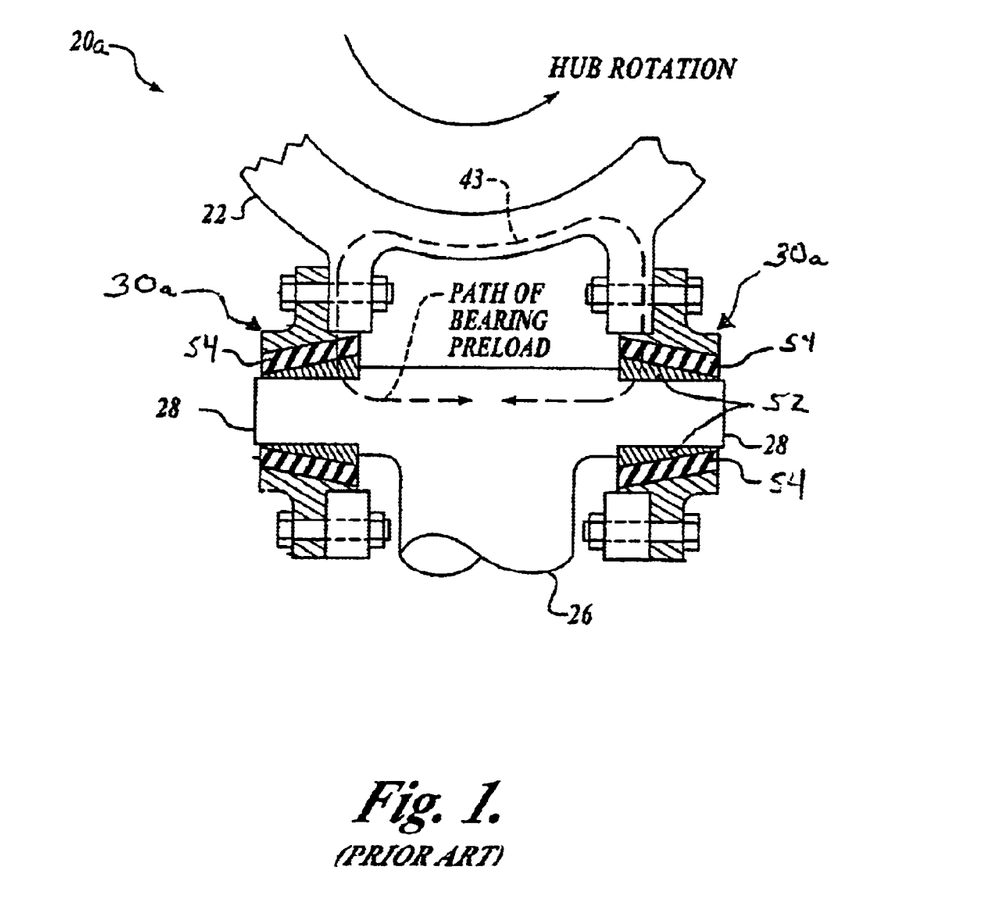
FIG. 1 is a partially sectional isolated plan view of a prior art bearing assembly.

Elastomeric conical bearings are commonly used in bearing assemblies for helicopter rotor systems to accommodate rotor motion. The bearing assemblies are axially preloaded to prevent the conical bearing elements from experiencing a resultant tensional load. Currently, mono-directional bearing elements are employed at each attachment site of the main rotor hub. FIG. 1 depicts a view of a prior art articulated hub assembly 20a. The hub assembly 20a includes a tie bar 26 connected to a hub center body 22. Each bearing assembly 30a includes a conical bearing elements 52 contacting the journal 28 on the bearing's inner surface 52 and the outer bearing surface is contained within an outer housing 42a. Each bearing assembly also includes a mono-directional single conical taper elastomeric bearing element 54 contained within. The conical bearing elements 52 are arranged such that the apex of the conical bearing elements 52 extends radially outward from one another. The bearing arrangement yields a force couple that extends from one bearing to the other. The force couple yields a bearing pre-load path 43 extending through the hub center body 22.

The prior art design creates an extended force couple resulting in a bearing pre-load path extending through the main rotor hub center body. The hub center body must be designed to carry the extra loading. The extra design requirements add weight to the overall rotor hub reducing the aircraft's load capacity and fuel efficiency.

SUMMARY OF THE INVENTION

The invention provides a weight-reducing bearing assembly for rotary aircraft. An opposed tapered conical elastomeric flap bearing assembly for rotary aircraft includes an outer housing having an outer surface and an inner surface. The outer surface is configured to mechanically connect the bearing assembly to the attachment sections of the hub center body. The inner surface is configured to receive a pair of opposed taper conical bearing elements. An inboard bearing element and an outboard bearing element are located within the outer housing. The bearing elements are arranged in an opposed manner. An axial pre-load can be applied to the opposed bearing assembly wherein the resulting force couple bearing pre-load path is maintained entirely within the bearing assembly. Consequently, the weight of the main rotor hub is reduced increasing the efficiency of rotary flight.

The proposed invention provides a unique flap bearing arrangement by localizing the pre-load within each flap bearing assembly and, thus, eliminates the necessity for the transfer of the pre-load through the hub structure. The elimination of bearing pre-load through the hub structure can significantly reduce weight of the rotor hub assembly. Many components, including the bearing attachment flanges on the hub center body as well as the bearing housings can be configured to accommodate only the design flight and static loads without having to carry the off axis bearing pre-loads. The unique design of the instant invention yields an approximate 6%–10% weight reduction in the main rotor hub assembly.

BRIEF DESCRIPTION OF THE DRAWINGS

The preferred and alternative embodiments of the present invention are described in detail below with reference to the following drawings.

DETAILED DESCRIPTION OF THE INVENTION

Figure 2:
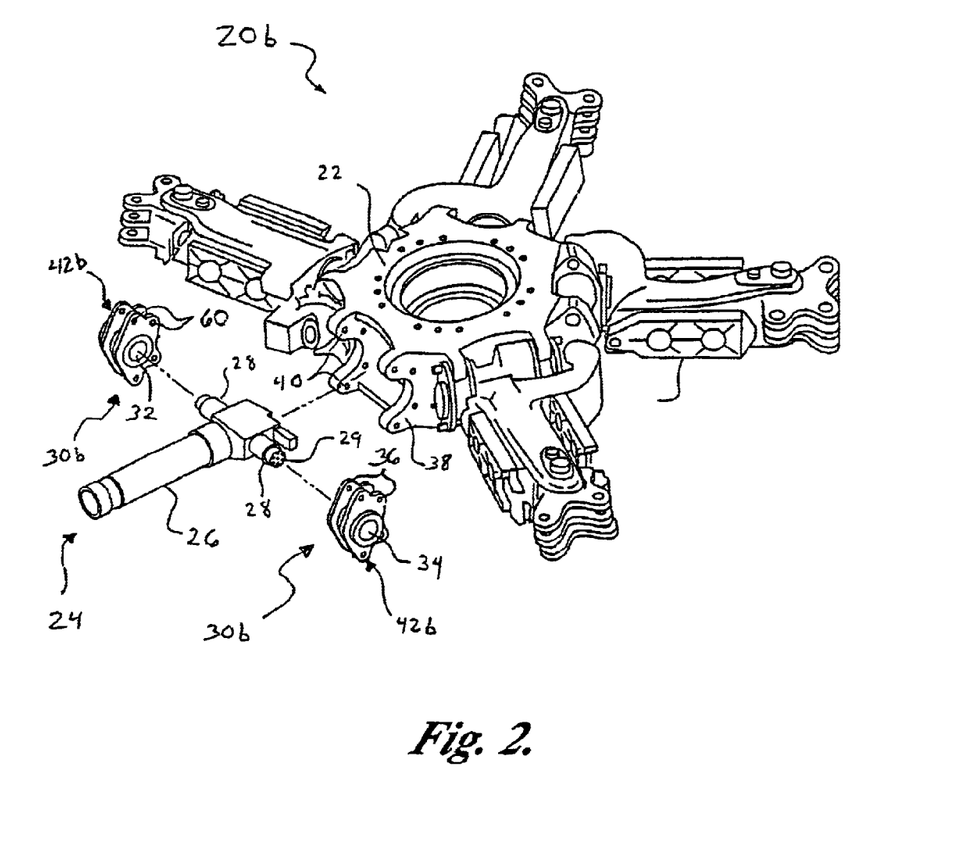
FIG. 2 is an isometric view of an articulated hub assembly.

FIG. 2 depicts a fully articulated hub assembly 20b that includes a pre-loaded, opposed bearing assembly 30b that maintains a force couple bearing pre-load path entirely within the bearing assembly 30b. The hub assembly 20b includes a plurality of rotor assemblies 24 radially attached to a hub center body 22. The articulated hub assembly 20b is designed to allow and to control the flap, pitch and lead-lag motion of an aircraft rotor.

In a presently preferred embodiment, the rotor assembly 24 includes a tie bar 26. However, any other rotor attachment structure or assembly is considered within the scope of the invention. The tie bar 26 is a substantially cylindrical shaped element having a pair of radially opposed journals 28 at an end. Each journal 28 is designed to receive the bearing assembly 30b. The bearing assembly 30 extends over the journal 28 attaching itself to the journal 28. The tie bar 26 and bearing assembly 30b combination attach the rotor assembly 24 to the hub center body 22.

The bearing assembly 30b includes an inboard bearing element 32 and an outboard bearing element 34 contained within an outer housing 42b. An outer surface of the outer housing 42b is configured to attach the bearing assembly 30b to another structure, for example, the main rotor hub 22. In a presently preferred embodiment, the outer housing 42b includes two pair of radially extending bearing flanges 36 configured to mate with a hub yolk 38 of the hub center body 22. However, any other structure or arrangement for attaching the bearing assembly to the rotor hub located on the outer housing 42b is considered within the scope of this invention, including, to provide a pair of non-limiting examples, an outer housing having a single pair of flange projections or an outer housing molded to fit a shape of the hub. A plurality of flange bores 60 align with yolk bores 40 allowing fasteners (not shown) to rigidly attach the structures.

Figure 3:
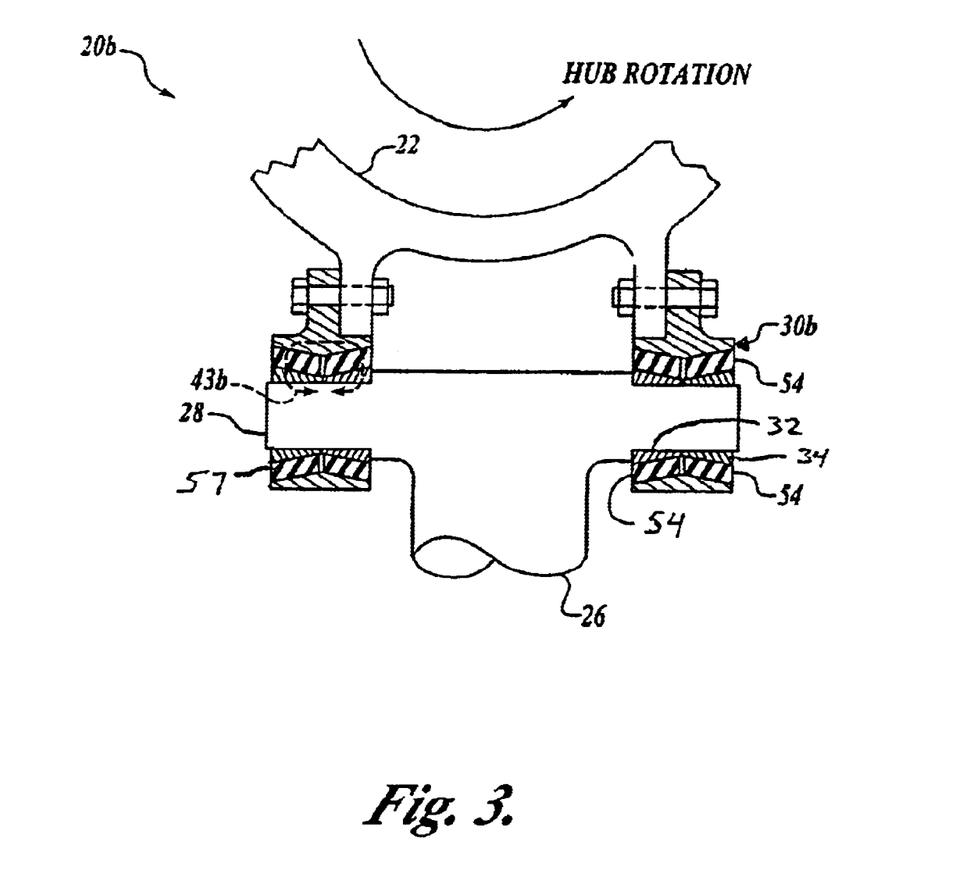
FIG. 3 is a partially sectional isolated plan view of a bearing assembly of the instant invention.

FIG. 3 depicts an isolated view of the hub assembly 20b of the instant invention. The tie bar 26 is attached to the hub assembly 20b via a pair of bearing assemblies 30b attached to the hub yolk 22 by attachment lugs 58. The bearing assemblies 30b extend over and contact each respective journal 28. Each bearing assembly 30b includes a mated set of opposed, taper conical bearing elements, 32 and 34, enclosed within an outer housing 42b. When preloaded in the axial direction, the opposed bearing assembly 30b limits the force couple to each individual bearing assembly 30b. According to the invention, the force couple is not passed through the hub center body 22. The force couple yields a bearing pre-load path 43b that remains entirely within each respective bearing assembly 30b.

Figure 4:
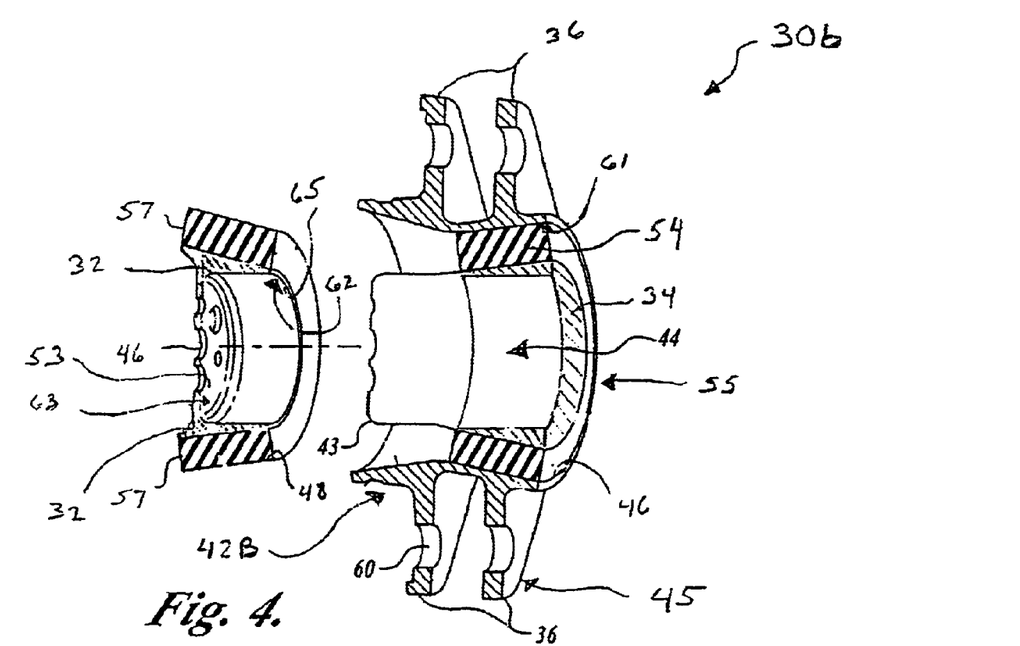
FIG. 4 is an exploded isometric view of the bearing assembly.

FIG. 4 depicts an exploded view of the bearing assembly 30b. The bearing assembly 30b includes an outboard bearing element 34 and an inboard bearing element 32 disposed within an outer housing 42b. The outer housing 42b includes a first section 45 and a second section 47.

The first section 45 includes a pair of radially extending flange sections 36. The flange sections 36 are configured to align with the hub yolk 38 (FIG. 1). An inner surface of the first section 45 is shaped to receive the second section 47 and, thus, the inboard bearing element 32. More specifically, an outer surface of the outboard bearing element 34 engages an elastomeric bearing element 54 which, in turn is bonded to a race 61 formed in an inner surface of the outer housing 42b in the first section 45. The bonding method is suitably any commonly known bonding method used in the art.

The composition of the elastomeric element 54 can be any of the commonly employed elastomeric compositions, and is variable based upon the loading requirements of the employment environment. For example, an elastomeric element with a plurality of metal laminates is considered within the scope of this invention.

Positioned on an inner surface of the second section 47 is race 62 for receiving the elastomeric element 57 which receives the inboard bearing element 32. The race 62 includes a distal section 63 and a proximal section 65. An outer edge of the race 62 is tapered in the direction of the inner bearing element 32. The inner surface of the proximal section 65 forms an axial bore 44 therethrough. The bore 44 is sized to receive the journal 28 through an open end 55 and extends into the distal section 63. The axial bore 44 terminates at an inner race closed end plate 53 located in the distal section 63.

The closed end plate 53 has a plurality of aligned bores extending therethrough. A tie bar attachment bore 46 is centrally disposed through each to receive a tie bar attachment lug (not shown). The tie bar attachment lug maintains the bearing assembly's 30b connection with the tie bar 26. Further, a plurality of coupler bores (not shown) disposed through the respective surfaces. Each coupler bore receives a coupler lug 49 (FIG. 6) to forcibly join the outer housing 42b and thereby maintain the spatial integrity between the inboard and outboard bearing elements. Further, a plurality of dowel bores extend through the closed end plate 63, with each bore receiving alignment dowels (not shown) extending from the journal end 29 (FIG. 1).

Figure 5:
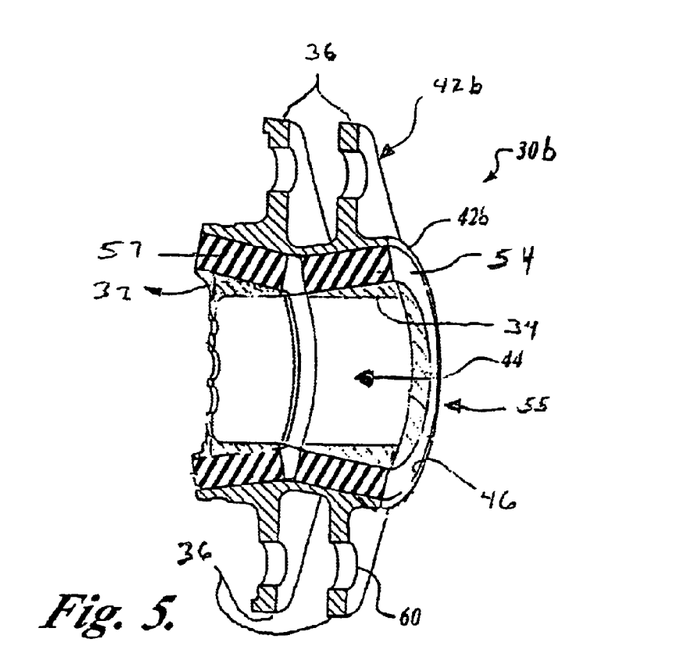
FIG. 5 is an isometric view of the bearing assembly.

FIG. 5 depicts an assembled view of the bearing assembly 30b. The inboard bearing element 32 and the outboard bearing element 34 are coupled between the respective element of the outer housing 42b. Consequently, the outer housing 42 encompasses both the inboard bearing element and the outboard bearing in a single unitary assembly.

Figure 6:
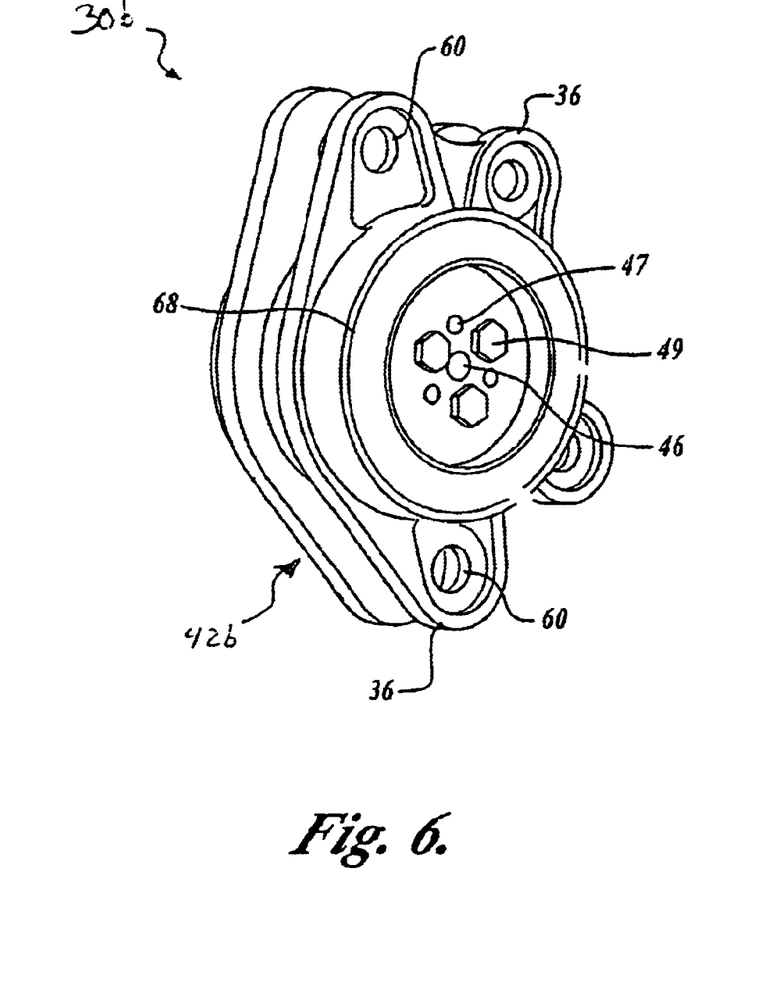
FIG. 6 is an alternative isometric view of the bearing assembly.

FIG. 6 depicts the assembled bearing assembly 30. The bearing assembly includes an outer housing 42b surrounding the inner and outer bearing elements 32 and 34 (FIGS. 4 and 5). The outboard bearing assembly 34 is pressure fit into the inboard bearing element 32 and then bonded between the outer race of the outboard baring 66 and an inner surface of the inboard bearing.

As discussed above, bearing coupler lugs 49 are disposed through the bearing coupler bores 48 connecting the outboard bearing element to the inboard bearing element. Additionally, a tie bar attachment bore is axially located through the respective bearing elements and is in alignment with a respective bore in the journal end 29 (see FIG. 1). An attachment lug 58 (not shown) is disposed through the tie bar attachment bore 46 and mechanically fastened to the journal end 29. Consequently, a bearing integrity redundancy is created by to the two separate coupling structures.

The bearing assembly 30 is axially pre-loaded. In the preferred embodiment, a bearing assembly 30 axial pre-load of 8500–15,000 lb. range is desired. The pre-load helps to prevent the elastomeric elements of the bearing assembly 30 from tensional loading during operating conditions. However, any other pre-load is considered within the scope of this invention. The axial pre-load can be applied through the coupler lugs 49, the tie bar attachment lug (not shown) or combinations thereof.

Figure 7:
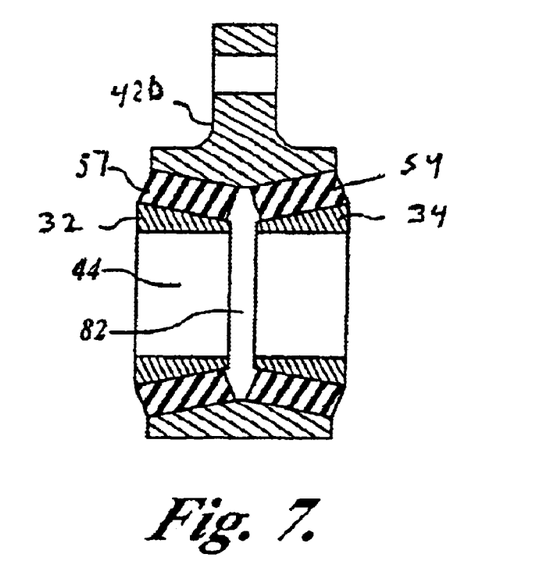
FIG. 7 is a partial sectional view of the bearing assembly.
Figure 8:
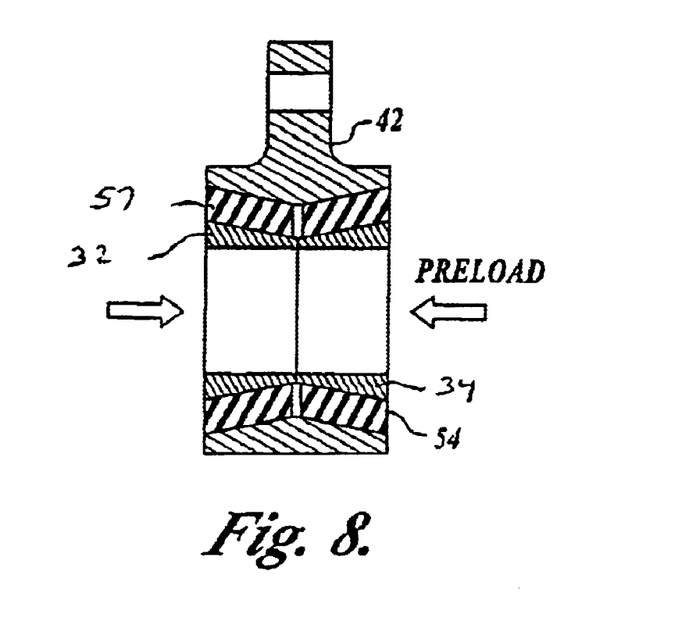
FIG. 8 is a partial sectional view of the bearing assembly.

FIGS. 7 and 8 depict an isolated view of the opposed conical elastomeric bearing assemblies with and without pre-loading, FIG. 7, and with pre-loading, FIG. 8. A bearing gap 82 is located between the respective inboard and outboard bearing elements, 32 and 34 respectfully, prior to any axial pre-loading. As the axial pre-load is applied the bearing elements, 32 and 34, are brought together. The elastomeric bearing elements 54 and 57 engage one another and any space, or bearing gap 82, between the bearing elements, 32 and 34 is removed. The bearing elements, 32 and 34, combine within the bearing assembly 30b to carry the flap-wise motion of the rotor assembly 24 (FIG. 2).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A rotary aircraft elastomeric bearing assembly, comprising:

an outer housing having a first section and a second section;

a tapered conical inboard bearing element disposed within the first section, a taper of the inboard bearing being inwardly directed; and, a tapered conical outboard bearing element disposed within the second section, a taper of the outboard bearing being inwardly directed in a direction that is substantially directly opposed to the inboard bearing taper, wherein an axial pre-load is applied through the opposed inboard bearing element and the outboard bearing element.

2. The bearing assembly of claim 1, further comprising a plurality of flange sections extending from the outer housing.

3. The bearing assembly of claim 1, further comprising an elastomeric element within the inboard bearing element.

4. The bearing assembly of claim 1, further comprising an elastomeric element within the outboard bearing element.

5. The bearing assembly of claim 1, wherein an outer surface of the inboard bearing element is bonded to an inner surface of the outer housing.

6. The bearing assembly of claim 1, wherein an outer surface of the outboard bearing element is bonded to an inner surface of the outer housing.

7. The bearing assembly of claim 1, wherein the inner race of the inboard bearing and the inner race of the outboard bearing are configured to receive a journal.

8. The bearing assembly of claim 1, wherein the axial pre-load is about 8,500 to 15,000 pounds.

9. A rotary aircraft opposed tapered conical elastomeric flap bearing assembly, comprising:

an outer housing defining a first and a second section, the outer housing having an outer surface configured to attach to a hub center body and an inner surface configured to receive a set of opposed taper conical bearing elements;

a tapered conical inboard bearing element having an outer race and an inner race, the outer race being bonded to the inner surface of the outer housing and the inner race having an extended portion defining a closed end plate, the tapered conical bearing element having a taper directed toward the closed end plate, the closed end plate defining a plurality of bores therethrough;

a tapered conical outboard bearing element having an outer race and an inner race, the outer race being bonded to the inner surface of the outer housing and the inner race being frictionally engaged with the extended portion of the inner race of the inboard bearing element, a taper of the outboard bearing element being inwardly directed in a direction that is substantially directly opposed to the inboard bearing taper, the inner race of the outboard bearing element forming an outer plate defining a plurality of bores therethrough, wherein an axial pre-load is applied to the inboard bearing element and the outboard bearing element; and at least one bearing coupler lug connecting the bearing elements.

10. The bearing assembly of claim 9, wherein the pre-load is in a range from about 8,500 pounds to about 15,000 pounds.

11. The bearing assembly of claim 9, wherein the plurality of bores defined through the respective inner races includes at least one of an axial bore, a bearing coupler bore and a dowel bore.

12. The bearing assembly of claim 9, further comprising an elastomeric element within the inboard bearing element.

13. The bearing assembly of claim 9, further comprising an elastomeric element within the outboard bearing element.

14. A rotary aircraft fully articulated hub assembly, comprising:

a hub center body including a plurality of attachment sections, configured to receive a plurality of bearing assemblies, positioned about a periphery of the hub center body;

a plurality of rotor assemblies configured to receive a pair of bearing assemblies; and a plurality of bearing assemblies including an outer housing having an outer surface and an inner surface, the outer surface configured to mechanically connect the bearing assembly to the attachment sections of the hub center body, the inner surface being configured to receive a pair of taper conical elastomeric bearing elements, a taper of an outboard bearing element being inwardly directed in a direction that is substantially directly opposed to an inboard bearing taper, each bearing having an inner race and an outer race, an axial pre-load being applied through the inboard bearing element and the outboard bearing element, the respective inner race bearing elements being configured to receive a portion of the rotor assemblies.

15. The hub assembly of claim 14, wherein the axial pre-load is in a range from about 8,500 pounds to about 15,000 pounds.

16. The hub assembly of claim 14, wherein the outer race of each bearing element is bonded to the inner surface of the outer housing.

17. The hub assembly of claim 14, wherein the inner race of one bearing element frictionally engages the inner race of the other bearing element.

18. The hub assembly of claim 14, further comprising closed end plates formed by the respective inner races of the inboard bearing element and the outboard bearing element.

19. The hub assembly of claim 18, further comprising a plurality of bearing coupler lugs connecting the inboard bearing element and the outboard bearing element within the outer housing.

20. The hub assembly of claim 18, further comprising a tie bar attachment lug centrally disposed through the closed end plates connecting the bearing assembly to the rotor assembly.

* * * * *

UNITED STATES PATENT AND TRADEMARK OFFICE
CERTIFICATE OF CORRECTION

PATENT NO. : 6,889,965 B2
APPLICATION NO. : 09/974991
DATED : May 10, 2005
INVENTOR(S) : Robert T. Loftus et al.

It is certified that error appears in the above-identified patent and that said Letters Patent is hereby corrected as shown below:

The title page should be deleted and substitute therefore the attached title page.

Drawings:

Delete drawing sheets 1-8, and substitute therefore the drawing sheets, consisting of Figs. 1-8.

United States Patent
Loftus et al.

(10) Patent No.: US 6,889,965 B2
(45) Date of Patent: May 10, 2005

(54) OPPOSING CONICAL PRELOADED ELASTOMERIC BEARING ASSEMBLY

(75) Inventors: Robert T. Loftus, Gilbert, AZ (US); Neal M. Muylaert, Apache Junction, AZ (US)

(73) Assignee: The Boeing Company, Chicago, IL (US)

( * ) Notice: Subject to any disclaimer, the term of this patent is extended or adjusted under 35 U.S.C. 154(b) by 114 days.

(21) Appl. No.: 09/974,991

(22) Filed: Oct. 10, 2001

(65) Prior Publication Data
US 2003/0068104 A1 Apr. 10, 2003

(51) Int. Cl.$^7$ .............................. F16M 1/00
(52) U.S. Cl. ................. 267/136; 416/134 A
(58) Field of Search ................. 416/134 A, 191, 416/244 R, 244 B, 106, 107, 160, 135; 384/221; 267/136

(56) References Cited

U.S. PATENT DOCUMENTS

| | | | |
|---|---|---|---|
| 2,482,488 A | * | 9/1949 | Julien .................... 267/33 |
| 3,782,854 A | | 1/1974 | Rybicki |
| 3,862,812 A | | 1/1975 | Gorndt et al. |
| 4,028,002 A | | 6/1977 | Finney et al. |
| 4,129,403 A | * | 12/1978 | Watson ................ 416/134 A |
| 4,297,078 A | * | 10/1981 | Martin ................. 416/134 A |
| 4,306,836 A | * | 12/1981 | Mayerjak ............ 416/134 A |
| 4,341,499 A | | 7/1982 | Peterson |
| 4,365,936 A | | 12/1982 | Hatch |
| 4,859,148 A | | 8/1989 | Hibyan |
| 5,601,408 A | | 2/1997 | Hunter et al. |
| 6,413,048 B1 | * | 7/2002 | Muylaert ............. 416/134 A |

* cited by examiner

Primary Examiner—Robert A. Siconolfi
Assistant Examiner—Melanie Torres
(74) Attorney, Agent, or Firm—Black Lowe & Graham PLLC (57) ABSTRACT

The invention provides a weight-reducing bearing assembly for rotary aircraft. An opposed tapered conical elastomeric flap bearing assembly for rotary aircraft includes an outer housing having an outer surface and an inner surface. The outer surface is configured to mechanically connect the bearing assembly to the attachment sections of the hub center body. The inner surface is configured to receive a pair of opposed taper conical bearing elements. An inboard bearing element and an outboard bearing element are located within the outer housing. The bearing elements are arranged in an opposed manner. An axial pre-load can be applied to the opposed bearing assembly wherein the resulting force couple bearing pre-load path is maintained entirely within the bearing assembly. Consequently, the weight of the main rotor hub is reduced increasing the efficiency of rotary flight.

20 Claims, 6 Drawing Sheets

UNITED STATES PATENT AND TRADEMARK OFFICE
CERTIFICATE OF CORRECTION

| | | |
|---|---|---|
| PATENT NO. | : 6,889,965 B2 | |
| APPLICATION NO. | : 09/974991 | |
| DATED | : May 10, 2005 | |
| INVENTOR(S) | : Robert T. Loftus et al. | |

Figure 3A:
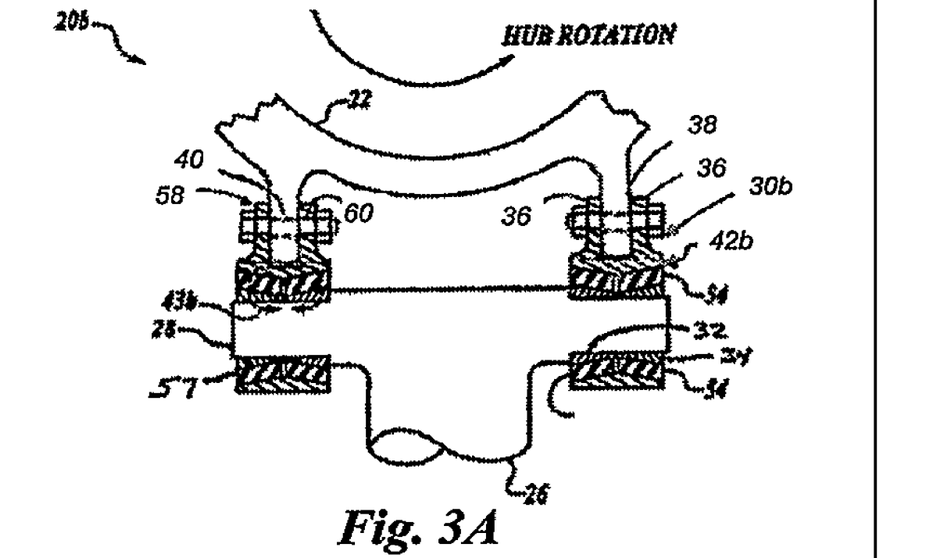
Figure 3B:
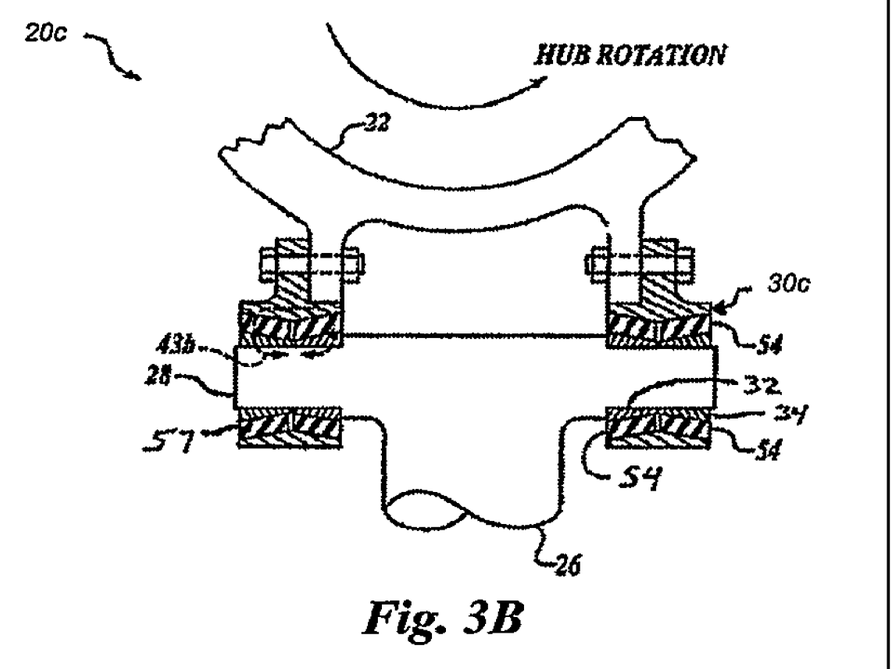

It is certified that error appears in the above-identified patent and that said Letters Patent is hereby corrected as shown below:

at col. 1, line 45, please replace "20aincludes" with -- 20a includes --;

at col. 1, line 48, please delete "52";

at col. 2, line 37-38, please replace "is a" with -- shows --, and please replace "view of a bearing assembly" with -- views of bearing assemblies --;

at col. 2, line 39, please replace "isometric" with -- cross sectional --;

at col. 2, line 42, please replace "an isometric" with -- a cross sectional --;

at col. 3, line 3, after "30b", please insert --, as shown in FIG. 3A, --;

at col. 3, line 10, please replace "yolk" with -- yoke --;

at col. 3, line 16, after "projections" please insert --, (e.g. bearing assembly 30c shown in FIG. 3B), --;

at col. 3, line 17, please replace "yolk" with -- yoke --;

at col. 3, line 20, please replace "3" with -- 3A --, and please replace "an isolated" with -- a partial sectional isolated plan --;

at col. 3 line 23, please replace "yolk" with -- yoke --;

at col. 3, line 34, after "exploded" please insert -- cross sectional --;

at col. 3, line 41, please replace "yolk" with -- yoke -- and please replace "FIG. 1" with -- FIGS. 2 and 3A --;

at col. 3, line 60, please replace "the proximal" with -- inner bearing --;

at col. 3, line 61, please replace "section 65" with -- element 32 --;

at col. 4, line 9, please replace "65" with -- 53 --;

at col. 4, line 10, please replace "29 (FIG. 1)" with -- 28 (FIG. 2) --;

at col. 4, line 11, please replace "an assembled" with -- a cross sectional --;

UNITED STATES PATENT AND TRADEMARK OFFICE
CERTIFICATE OF CORRECTION

PATENT NO. : 6,889,965 B2  
APPLICATION NO. : 09/974991  
DATED : May 10, 2005  
INVENTOR(S) : Robert T. Loftus et al.

Page 4 of 10

It is certified that error appears in the above-identified patent and that said Letters Patent is hereby corrected as shown below:

at col. 4, line 15, please replace "42 encompasses" with -- 42b encompasses --;

at col. 4, line 20, please replace "assembly" with -- element --;

at col. 4, line 22, after "race" please insert -- 66 --, please replace "baring 66" with --bearing --, and after "surface" please insert -- 67 --;

at col. 4, line 27, after "bore" please insert -- 46 --;

at col. 4, line 29, please replace "29" with -- 28 --, and please replace "1" with -- 2 --;

at col. 4, line 30, please delete "58";

at col. 4, line 32, please replace "29" with -- 28 --;

at col. 4, line 33, please delete "to"; and

Signed and Sealed this

Twenty-sixth Day of December, 2006

JON W. DUDAS  
*Director of the United States Patent and Trademark Office*